(12) United States Patent
Vaaler

(10) Patent No.: US 6,219,201 B1
(45) Date of Patent: Apr. 17, 2001

(54) TAPE CARTRIDGE INCLUDING PASSIVE CLEANER

(75) Inventor: Erik Vaaler, Redwood City, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/363,319

(22) Filed: Jul. 28, 1999

(51) Int. Cl.[7] ............................. G11B 23/02; G11B 33/14
(52) U.S. Cl. ............................................. 360/132; 360/128
(58) Field of Search ..................................... 360/128, 143

(56) References Cited

U.S. PATENT DOCUMENTS

| 4,736,845 | 4/1988 | Balderas et al. | 206/400 |
|---|---|---|---|
| 4,769,730 | 9/1988 | Okamura et al. | 360/132 |
| 4,803,584 | 2/1989 | Doi et al. | 360/133 |
| 4,905,112 | * 2/1990 | Rhodes | 360/132 |
| 4,984,119 | 1/1991 | Backlund et al. | 360/128 |
| 5,019,933 | * 5/1991 | Karsh | 360/132 |
| 5,023,739 | 6/1991 | Shinohara et al. | 360/132 |
| 5,235,486 | * 8/1993 | Hibino et al. | 360/132 |
| 5,453,897 | 9/1995 | Bakerman | 360/132 |
| 5,986,859 | * 11/1999 | Nishiyama et al. | 360/132 |
| 6,043,964 | * 3/2000 | Chiba | 360/133 |

FOREIGN PATENT DOCUMENTS

| 2674980 | 10/1992 | (FR) . |
|---|---|---|
| 58098886 | 6/1981 | (JP) . |
| 57-050339 | 3/1982 | (JP) . |
| 58-133678 | 8/1983 | (JP) . |
| 9108570 | 6/1991 | (WO) . |

* cited by examiner

Primary Examiner—Jefferson Evans

(57) ABSTRACT

A magnetic tape drive cartridge includes a housing and a capture material such as double-backed adhesive tape secured to an inner surface of the housing. The capture material can capture debris such as wear particles, dust and dirt within the housing.

9 Claims, 2 Drawing Sheets

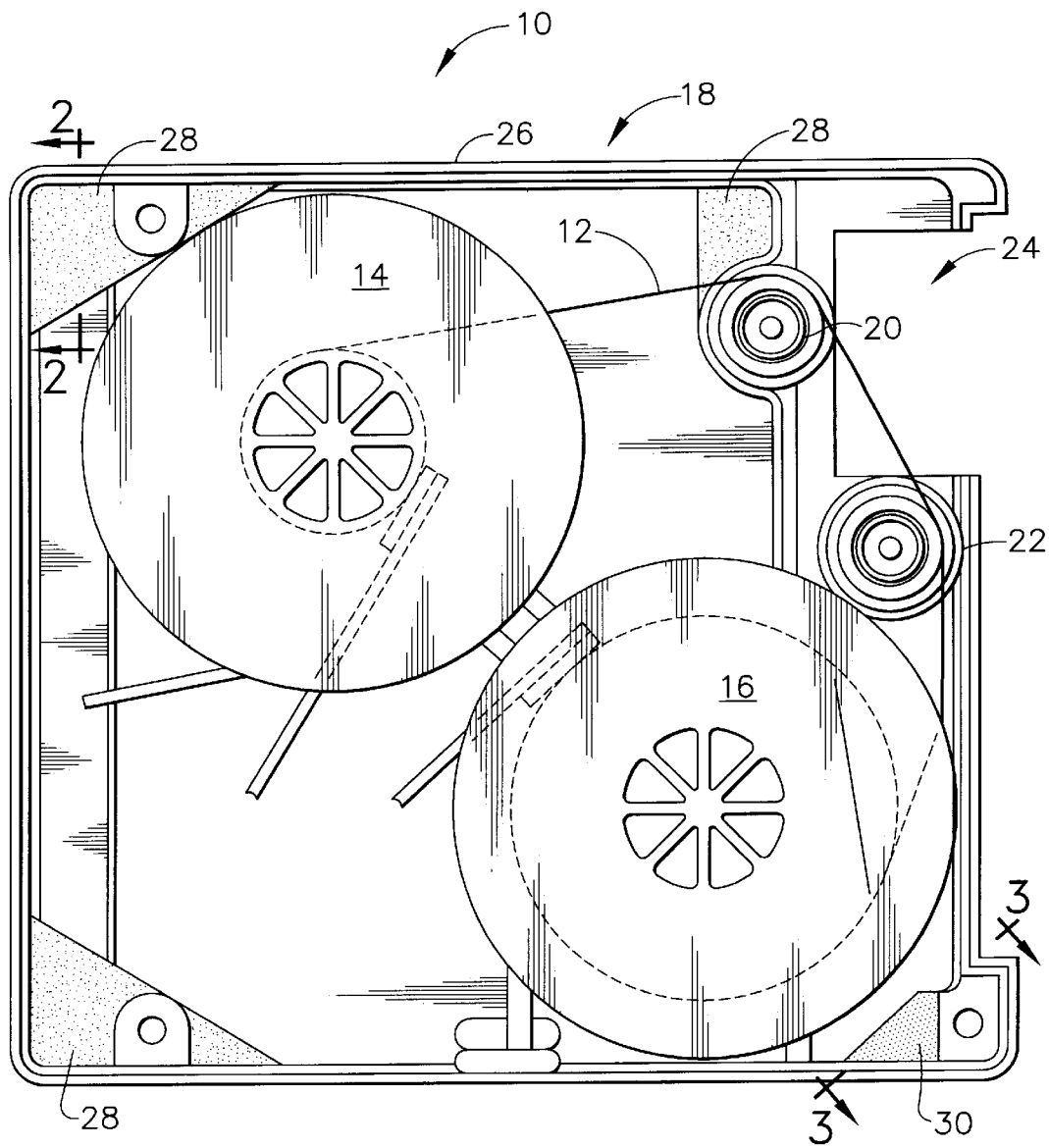
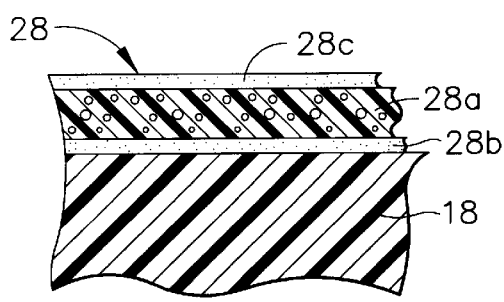
FIG. 2
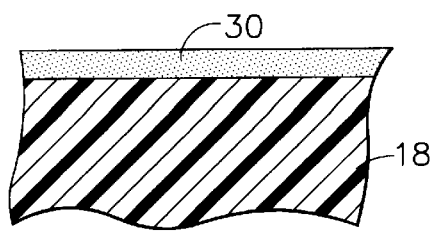
FIG. 3

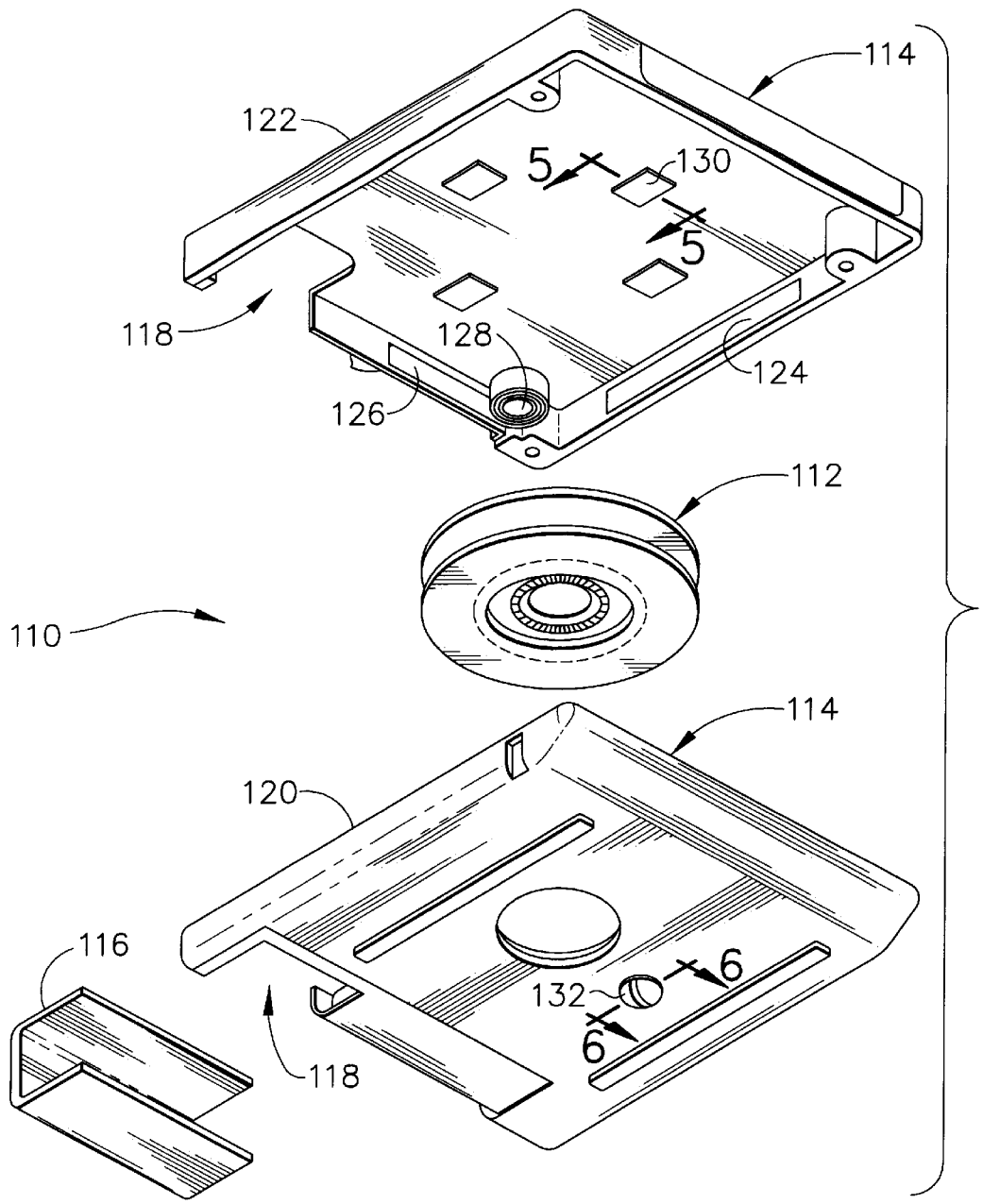
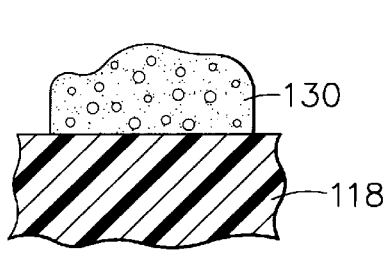
FIG. 5
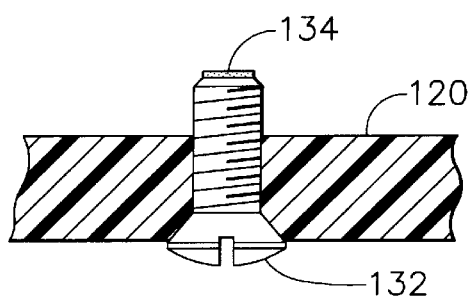
FIG. 6

TAPE CARTRIDGE INCLUDING PASSIVE CLEANER

BACKGROUND OF THE INVENTION

The invention relates to computer data storage devices. More specifically, the invention relates to a tape cartridge for a computer tape drive.

Major causes of data loss in computers include accidental file deletion, hard-drive malfunctions, viruses and system failures, power surges, theft of computers and natural disasters such as fires. Installing and uninstalling software can also cause data loss.

Loss of data stored in a computer can result in a significant loss of time and money. For a business, any of these causes might result in the loss of client lists, product information, payroll, personnel files, tax records and other vital information. The consequences can be disastrous.

Tape technology offers efficient and cost-effective protection against data loss. Tape drives offer a range of media that allow data on hard drives and servers to be backed up. A snapshot of a full system, including programs and data files, can be captured on a single tape cartridge. Backing up a computer on a regular basis will ensure that vital data is not lost.

A typical tape cartridge includes magnetic tape and one or two reels. A Travan cartridge is a well known type of two-reel cartridge. A "3480/3490" cartridge is a well known type of single reel cartridge.

The tape must not become damaged or degraded. If the tape becomes degraded or damaged, valuable data might be lost forever.

The tape can become damaged or degraded by debris inside the tape cartridge. During storage or use of the tape cartridge, debris such as particles of dust and dirt can enter inside the tape cartridge. Such debris can damage the tape and interfere with the read/write process. During use of the tape cartridge, oxide particles can fall off the tape. These wear particles can also damage the tape and interfere with the read/write process.

Problems with debris will become even greater as storage capacity of the tape is further increased to accommodate the ever-increasing storage capacity of hard drives. The storage capacity of the tape may be increased by increasing bit density. As the bit density is increased, however, the tape becomes more sensitive to wear particles and the other debris inside the cartridge.

There is presently a need to protect magnetic tape against debris. This need will become greater as tape bit density is further increased.

SUMMARY OF THE INVENTION

This need is met by the present invention, which may be regarded as a tape cartridge for a computer tape drive. The cartridge includes a housing; at least one tape reel within the housing; a magnetic tape wound around at least one reel; and a capture material secured to the housing. The capture material has an exposed surface within the housing. The exposed surface is not in contact with the tape. The capture material can capture debris within the housing.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is an illustration of a two-reel tape cartridge for a computer tape drive;

FIG. 2 is a cross-sectional view of the tape cartridge shown in FIG. 1, the view being taken along lines 2—2 of FIG. 1;

FIG. 3 is a cross-sectional view of the tape cartridge shown in FIG. 1, the view being taken along lines 3—3 of FIG. 1;

FIG. 4 is an illustration of a single reel tape cartridge for a computer tape drive;

FIG. 5 is a cross-sectional view of the tape cartridge shown in FIG. 4, the view being taken along lines 5—5 of FIG. 4; and FIG. 6 is a cross-sectional view of the tape cartridge shown in FIG. 4, the view being taken along lines 6—6 of FIG. 4.

DETAILED DESCRIPTION OF THE INVENTION

As shown in the drawings for purposes of illustration, the present invention is embodied in a tape cartridge for a computer tape drive. The tape cartridge includes magnetic tape, a housing and a capture material for capturing debris such as wear particles and dust inside the housing. The capture material reduces the amount of debris that can damage the tape or interfere with the read/write process.

FIG. 1 shows a two-reel tape cartridge 10. The tape cartridge 10 includes a tape 12 wound between a supply reel 14 and a take-up reel 16. The tape cartridge 10 further includes a housing 18 for the tape 12 and the reels 14 and 16. The reels 14 and 16 are located inside the housing 18. The tape 12 is guided by tape guides 20 and 22. A media access port 24 in the housing 18 allows a read/write head of a tape drive to access that portion of the tape 12 between the tape guides 20 and 22. The tape cartridge 10 may be compatible with standard cartridges such as "Travan" cartridges.

The housing 18 may be split into two pieces: a base plate and a cover. Only the base plate 26 is shown in FIG. 1. Capture material may be secured to either the base plate 26 or the housing cover.

The capture material includes a double-backed adhesive tape 28 (also shown in FIG. 2). The double-backed tape 28 includes a backing 28a, and adhesive 28b and 28c on opposite sides of the backing. The adhesive 28b on one side of the backing 28a is adhered to a surface of the housing 18, and the adhesive 28c on the opposite side of the backing 28a is exposed to debris within the housing 18. The exposed adhesive 28c can capture debris such as dust, dirt and wear particles. The double-backed tape 28 could be double-sided scotch tape.

The capture material also includes a layer 30 of adhesive material applied directly to a surface of the housing 18 (also shown in FIG. 3). The adhesive may be applied in a thin layer, about one mil thick, so as not to migrate. The exposed layer 30 can also capture debris such as dust, dirt and wear particles.

Capture materials including adhesives are placed away from air flow in the housing 18. Among the locations for the adhesive-based capture materials 28 and 30 are the corners of the housing 18. Air flow within the housing is caused by rotation of the reels 14 and 16.

FIG. 4 shows a magnetic tape cartridge 110 including a single reel 112 and a housing 114 for the reel. The reel 112 is located inside the housing 114. The tape cartridge 110 also includes a magnetic tape, which is not shown. The tape, which is wound around the reel 112, includes a leader block for interfacing with an automated threading subsystem of a tape drive. The tape cartridge 110 may be compatible with the "3480/3490" cartridge available from the IBM Corporation or the "DLT" cartridge available from the Quantum Corporation and the Digital Equipment Corporation. Such cartridges use half-inch magnetic tape for storing digital data.

The tape cartridge 110 further includes a sliding door 116. In its closed position, the sliding door 116 covers a media access port 118 in the housing 114. When the sliding door 116 is in an open position, the access port 118 is uncovered, and the tape can be accessed by the automated threading subsystem of the tape drive.

The housing 114 may be split into two pieces: a base plate 120 and a cover 122. Capture material may be secured to the base plate 120 and the cover 122.

The capture material includes double-backed adhesive tape 124. One side of the adhesive tape is secured to the cover 122, and the other side of the tape is exposed. The exposed side captures debris inside the housing 114.

The capture material further includes a single-backed adhesive tape 126 wound around a spool 128. The spool 128 is secured to the housing 114. An end of the single-backed tape 126 is accessible from outside the housing 114. The single-backed tape 126 may be threaded through a slot in the housing 114, or it may be accessible via the access port 118. This allows the single-backed tape 126 to be pulled outside of the housing 114. For example, after capturing debris over a certain period of time, a three-inch strip of the single-backed tape 126 could be pulled out of the housing 114 and torn off. A newly unspooled portion of single-backed tape 126 would then be used to capture the debris inside the housing 114.

The capture material also includes a porous material 130, which is located along an air flow path. Thus, the porous material 130 is placed closer to the reel 112 than would capture materials including adhesives. Debris enters the porous material 130 and becomes trapped. Porosity of the material 130 should be sufficient to allow the air to flow through. The porous material 130 may be a polymer foam (also shown in FIG. 5) or an open cell paper filter. The foam or paper may be thinly coated with oil. Debris flowing through the porous material 130 is captured by the oil and foam or paper. Thickness of the porous material may be about 1/32 inches. The porous material 130 may have a shape (e.g., strips, curved) other than the block-like shape shown in FIGS. 4 and 5.

The capture material further includes a plug 132 extending through the housing cover plate 120 (also shown in FIG. 6). The plug 132 may be a screw that threadedly engages the housing cover plate 120. At least one surface of the plug 132 is exposed within the housing 114. The plug 132 may be magnetized to attract metallic particles such as wear particles inside the housing 118. An end of the plug 132 may be provided with an adhesive layer 134 to capture debris. The plug 132 may be unscrewed from the housing 114, cleaned of debris, and re-attached to the housing 114.

Thus disclosed are tape cartridges 10 and 110 including capture materials for reducing the amount of debris that can damage tape or interfere with the read/write process. The capture materials can be located conveniently inside the tape cartridge housing so as not to interfere with moving parts of the tape cartridge 10 and 110.

Multiple types of capture material have been shown on the same tape cartridge. However, it is understood that a tape cartridge according to the present invention may include any one of the capture materials shown in FIGS. 1 to 6, or it may include more than one of the capture materials shown in FIGS. 1 to 6 (for example, a tape cartridge according to the present invention may include double backed tape and a magnetized plug). Moreover, location of the capture material is not limited to those locations shown in the Figures. Actual location, size, shape and pattern of the capture material will depend upon the design of the cartridge and the types of debris to be captured.

Capture materials other than those described above could be used. For example, the capture material could be a material having an electrostatically-charged surface. The charged surface would attract debris. If the inside of the housing can be accessed, debris on the electrostatically-charged surface could be scraped off and removed.

Therefore, the invention is not limited to the specific embodiments described and illustrated above. Instead, the invention is construed according to the claims that follow.

What is claimed is:

1. A tape cartridge comprising:
   a magnetic tape;
   a tape reel for the tape;
   a housing for the tape and the reel; and
   a magnetized capture material secured to the housing, the magnetized material having an exposed surface within the housing, the exposed surface not being in contact with the tape.

2. A tape cartridge comprising:
   a magnetic tape;
   a tape reel for the tape;
   a housing for the tape and the reel; and
   a magnetized capture plug inserted into a housing wall, at least one surface of the plug being exposed within the housing and not being in contact with the magnetic tape.

3. The cartridge of claim 2, wherein the plug is removable from the housing.

4. A tape cartridge comprising:
   a magnetic tape;
   a tape reel for the tape;
   a housing for the tape and the reel; and
   a layer of adhesive material applied directly to a surface of the housing, the adhesive material having an exposed non-tape contacting, debris-capturing adhesive surface inside the housing.

5. A tape cartridge comprising:
   a magnetic tape;
   a tape reel for the tape;
   a housing for the tape and the reel; and
   a spool of single-backed adhesive tape, the spool being secured to the housing, the tape, when unwound from the spool, having an exposed non-magnetic tape contacting, debris-capturing adhesive surface inside the housing.

6. The cartridge of claim 5, wherein an end of the adhesive tape is accessible from outside the housing, whereby the adhesive tape can be pulled outside of the housing.

7. A tape cartridge for a computer tape drive, the cartridge comprising:
   a housing;
   a magnetic tape;
   a tape reel for the tape;
   a housing for the tape and reel; and
   a porous capture material secured to the housing for capturing debris within the housing, the porous material being located along an air flow path, the porous material not being in contact with the magnetic tape.

8. The cartridge of claim 7, wherein the porous material is coated with a film of oil.

9. A tape cartridge comprising:

a magnetic tape;

a tape reel for the tape;

a housing for the tape and the reel; and a capture material secured to the housing, the capture material having an exposed surface within the housing, the exposed surface being electrostatically-charged and not being in contact with the tape.

* * * * *